(12) United States Patent
Eda et al.

(10) Patent No.: US 9,844,858 B2
(45) Date of Patent: Dec. 19, 2017

(54) FLAT-PLATE BONDING JIG AND METHOD OF MANUFACTURING FLAT-PLATE LAMINATED BODY

(75) Inventors: Yukio Eda, Shibukawa (JP); Toshiyuki Ibayashi, Shibukawa (JP); Hiroyuki Kurimura, Shibukawa (JP); Yutaka Ogino, Shibukawa (JP); Eitaro Fukutaka, Tokyo (JP); Takayuki Matsumoto, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 945 days.

(21) Appl. No.: 13/988,689

(22) PCT Filed: Nov. 18, 2011

(86) PCT No.: PCT/JP2011/076684
§ 371 (c)(1),
(2), (4) Date: May 21, 2013

(87) PCT Pub. No.: WO2012/070495
PCT Pub. Date: May 31, 2012

(65) Prior Publication Data
US 2013/0241128 A1 Sep. 19, 2013

(30) Foreign Application Priority Data
Nov. 22, 2010 (JP) .................. 2010-260260

(51) Int. Cl.
*B25B 11/00* (2006.01)
*B32B 37/00* (2006.01)
(Continued)

(52) U.S. Cl.
CPC ...... *B25B 11/005* (2013.01); *B32B 17/10889* (2013.01); *B32B 37/003* (2013.01);
(Continued)

(58) Field of Classification Search
USPC ........................... 269/21, 900, 903
See application file for complete search history.

(56) References Cited

U.S. PATENT DOCUMENTS

| | | | |
|---|---|---|---|
| 5,173,148 A | 12/1992 | Lisec | ............................ 156/578 |
| 5,380,387 A * | 1/1995 | Salamon | ............ B29D 11/00942 |
| | | | 156/154 |

(Continued)

FOREIGN PATENT DOCUMENTS

| | | |
|---|---|---|
| JP | 55-147612 A | 11/1980 |
| JP | H 3-123038 A | 5/1991 |

(Continued)

OTHER PUBLICATIONS

International Search Report for PCT/JP2011/076684; dated Jan. 24, 2012.

(Continued)

*Primary Examiner* — Larry E Waggle, Jr.
*Assistant Examiner* — Alvin Grant
(74) *Attorney, Agent, or Firm* — Stein IP, LLC

(57) ABSTRACT

Provided is a jig having a structure that differs from conventional jigs and enables flat plates to be bonded while suppressing an air bubble formation. A flat-plate bonding jig is provided with the following: a first surface; a second surface that is on the opposite side of the first surface, has a plurality of suction holes for sucking a flat-plate, and is curved outward in a substantially arc shape; a main body connecting the first surface and the second surface; and a communication means that is disposed in the main body and allows the suction holes to communicate with a suction means.

20 Claims, 9 Drawing Sheets

(51) Int. Cl.
| | |
|---|---|
| *B32B 38/18* | (2006.01) |
| *C03C 27/10* | (2006.01) |
| *G02F 1/13* | (2006.01) |
| *B32B 37/06* | (2006.01) |
| *B32B 17/10* | (2006.01) |

(52) U.S. Cl.
CPC .......... *B32B 37/06* (2013.01); *B32B 38/1858* (2013.01); *B32B 38/1866* (2013.01); *C03C 27/10* (2013.01); *G02F 1/1303* (2013.01); *B32B 38/1841* (2013.01); *B32B 2310/0831* (2013.01); *B32B 2457/20* (2013.01); *Y10T 156/10* (2015.01)

(56) References Cited

U.S. PATENT DOCUMENTS

| | | | | |
|---|---|---|---|---|
| 5,624,521 | A * | 4/1997 | Hed | B23Q 3/08 156/154 |
| 6,004,413 | A * | 12/1999 | Couttenier | B29C 35/10 156/273.5 |
| 6,228,203 | B1 * | 5/2001 | Kotoyori | B29C 66/8322 156/291 |
| 6,309,485 | B1 * | 10/2001 | Miyamoto | B29C 65/48 156/275.5 |
| 6,413,347 | B1 | 7/2002 | Hosaka et al. | 156/245 |
| 6,475,292 | B1 * | 11/2002 | Sahbari | G03F 7/426 134/3 |
| 6,627,309 | B2 * | 9/2003 | Stebbings | C08F 2/46 428/343 |
| 6,740,190 | B2 * | 5/2004 | Takase | G02F 1/1339 156/100 |
| 8,673,105 | B2 * | 3/2014 | Kurimura | G02F 1/1303 156/275.7 |
| 2001/0046644 | A1 * | 11/2001 | Ukachi | B29C 65/1406 430/281.1 |
| 2002/0062787 | A1 * | 5/2002 | Hashizume | B32B 38/1841 118/664 |
| 2003/0205333 | A1 * | 11/2003 | Hayafuji | B30B 15/0064 156/580 |
| 2004/0094264 | A1 * | 5/2004 | Yamaguchi | B32B 7/12 156/273.3 |
| 2005/0056363 | A1 * | 3/2005 | Takeyama | B32B 37/10 156/212 |
| 2008/0188157 | A1 * | 8/2008 | Tashiro | G02F 1/1303 445/25 |
| 2009/0186552 | A1 * | 7/2009 | Shinya | G02F 1/133502 445/58 |
| 2010/0000670 | A1 * | 1/2010 | Kurimura | C09J 4/00 156/247 |
| 2013/0037204 | A1 * | 2/2013 | Kurimura | B32B 17/10706 156/221 |
| 2013/0081752 | A1 * | 4/2013 | Kurimura | B32B 17/10036 156/64 |
| 2014/0150967 | A1 * | 6/2014 | Kurimura | B32B 37/12 156/275.5 |
| 2014/0158280 | A1 * | 6/2014 | Kurimura | B32B 37/12 156/64 |

FOREIGN PATENT DOCUMENTS

| | | |
|---|---|---|
| JP | 2000-53453 | 2/2000 |
| JP | 2000-79626 A | 3/2000 |
| JP | 2005-297409 A | 10/2005 |
| JP | 2007-30435 A | 2/2007 |
| JP | 2009-256125 | 11/2009 |

OTHER PUBLICATIONS

International Preliminary Report on Patentability dated Jun. 20, 2013, issued in corresponding International Application No. PCT/JP2011/076684.

European Search Report dated Jun. 26, 2014, issued to corresponding European Application No. 11842842689.9.

* cited by examiner

FLAT-PLATE BONDING JIG AND METHOD OF MANUFACTURING FLAT-PLATE LAMINATED BODY

CROSS-REFERENCE TO RELATED APPLICATIONS

This is a national stage application of PCT Application No. PCT/JP2011/076684, filed Nov. 18, 2011, which claims the benefit of Japanese Application No. JP 2010-260260, filed Nov. 22, 2010, in the Japanese Intellectual Property Office, the disclosures of which are incorporated herein by reference.

BACKGROUND OF THE INVENTION

1. Field of the Invention

The present invention relates to a bonding jig for flat-plates such as a plate glass. Furthermore, the present invention relates to a method of manufacturing a flat-plate laminated body.

2. Description of the Related Art

In display devices of various kinds of electronic apparatuses such as televisions, notebook computers, car navigation systems, electronic calculators, mobile phones, electronic organizers and personal digital assistants (PDAs), display elements such as liquid crystal displays (LCDs), organic EL displays (OELDs), electroluminescent displays (ELDs), field emission displays (FEDs), and plasma displays (PDPs) are used. Thus, in order to protect such a display element, a plate glass product for protection is generally placed to cover the display element. Recently, in many cases, a conductive film having a predetermined pattern, which is given on the surface of the plate glass product for protection, is also provided to give a role as a touch panel.

This plate glass product is made by processing a plate glass into proper size and shape for a corresponding display device, and furthermore, in order to respond to demands of the market asking for lowering a price level, a large amount of plate glass products have to be processed with high productivity.

Accordingly, Japanese Unexamined Patent Application Publication No. 2009-256125 (Patent Literature 1) proposes a method for enhancing the productivity of the plate glass product. Specifically, Japanese Unexamined Patent Application Publication No. 2009-256125 proposes "a method for processing a plate glass, comprising: forming a material glass block (A) by laminating many material plate glasses (1) and by integrally fixing each of the material plate glasses (1) each other with strippable fixing material (2) that is disposed between the material plate glasses (1); cutting the material glass block (A) along in-plane directions into small glass blocks (B) each having a small area; forming product glass blocks (C) into a product shape in plan view by processing at least peripheries of the divided small glass blocks (B); finishing end faces of the product glass blocks (C); and separating the individual product glass blocks (C)" (Claim 1). Accordingly, Patent Literature 1 draws a conclusion that "since a cutting process, a forming shape process, and a finishing process are conducted to the material glass block composed of many material plate glasses being laminated, it becomes possible to obtain many plate glass products with less processes and the productivity improves" (Paragraph 0007).

In addition, Patent Literature 1 describes that "the fixing material (2) disposed between the material plate glasses (1) is a photo-curable liquid binder which is cured by irradiation with ultraviolet rays and softened by temperature rise" (Claim 4). Accordingly, Patent Literature 1 describes that "by disposing a photo-curable liquid binder between the material plate glasses laminated in the up and down direction and applying pressure in the direction, liquid binder spreads between the material plate glasses to form a layer having an equal thickness over the entire material plate glasses. When the laminated material plate glasses under such a condition are irradiated with ultraviolet rays, the spread liquid binder layer is cured to integrally fix the plate glasses from top to bottom. Therefore, it is possible to integrally stick many laminated material plate glasses at high speed and with high accuracy. In addition, when the product glass block is put into hot water or the like and is heated up after a final processing (an end-face processing) is conducted, the binder cured between the plate glasses is softened and becomes the film to be separated. Therefore, the collection and the disposal of a binder become facilitated without generating the pollution of the environment" (Paragraph 0007).

The section "Best Mode for Carrying Out the Invention" in Patent Literature 1 describes that twenty material plate glasses are laminated while disposing a photo-curable liquid binder between the material plate glasses, and next, the binder is cured by irradiation with ultraviolet rays (UV light) from the upper surface of the laminated material plate glasses, and thus forming a material glass block whose material plate glasses, from top to bottom, are integrally laminated (Paragraphs 0010 and 0011).

On the other hand, there is a problem that air bubbles are easily generated at the bonding surface when flat plates such as a plate glass are bonded and the accuracy in thickness upon lamination is decreased, and various kinds of preventive measures have been proposed. For example, there is known a method for bonding by discharging air bubbles while gradually applying pressure from the start edge of adhesion toward the end edge of adhesion using a roller.

Japanese Unexamined Patent Application Publication No. 2000-53453 (Patent Literature 2) describes a method for bonding a thin plate glass, which bonds a thin plate glass to a targeted glass surface, including a first step of applying an adhesive agent on one surface of the targeted glass surface or the thin plate glass, a second step of bring one edge of the thin plate glass into contact with an edge of the targeted glass surface so that one surface of the thin plate glass is opposite to the targeted glass surface, a third step of conducting an elastic deformation so that the shape of the thin plate glass becomes a convex shape with respect to the targeted glass surface by adsorbing the thin plate glass to the surface of a jig which is able to be curved by reducing the pressure and a fourth step of gradually bring one surface of the thin plate glass into contact with the targeted glass surface by rolling a pressure roller from the one edge described above toward the opposed other edge (Claims 1 to 3).

In the same publication, as a jig which is be able to be curved, a bonding jig including a roller press member having elongated plate shaped members arranged in a width direction and connected bendably at each boundary and a plurality of adsorptive members disposed on the opposite surface to the surface on which a roller of this roller press member is pressed and adsorb the surface of the thin plate glass, is disclosed (Claim 8).

In addition, Japanese Unexamined Patent Application Publication No. H2-9733 (Patent Literature 3) describes a device for manufacturing a laminated glass including a transport device which transports a first glass plate, a conveyor which adsorbs and retains a second glass plate to transport in a lower side running unit, wherein the conveyor includes a conveyor belt which has many air suction holes and is set to allow endless rotational movement and a decompression chamber which is disposed to allow sucking air through the air suction holes at the upper side of the lower side running unit of the conveyor belt, wherein the conveyor belt is set so that a terminal of the lower side running unit comes closer to the transporting surface of the transport device and the distance between the transporting surface of the transport device at the terminal and the lower side running unit is slightly wider than the total thickness of the glass plates (Claim 1). Furthermore, Patent Literature 3 describes that the decompression chamber is plurally partitioned in the transporting direction and the pressure control is individually allowed for each of partitioned decompression chambers (Claim 3).

CITATION LIST

PTL 1: Japanese Unexamined Patent Application Publication No. 2009-256125

PTL 2: Japanese Unexamined Patent Application Publication No. 2000-53453

PTL 3: Japanese Unexamined Patent Application Publication No. 2-9733

SUMMARY OF THE INVENTION

By using the jig and the device described in Patent Literatures 2 and 3, it is possible to suppress air bubbles when flat-plates such as plate glasses are bonded.

However, in the jig described in Patent Literature 2, since there are many connection parts and the structure is complicated on top of which it is necessary to pull one end of the jig using a means such as an air cylinder, the entire system of bonding also becomes complicated. In addition, since an elongated plate-shape connection is a caterpillar shape and the last edge is pulled, the connection point is not curved smoothly and the steady welding pressure is not continually transmitted. Therefore, since the thickness of adhesive layer fluctuates, a mark of the stripe shape in the cross direction is easily made and an air bubble is easily mixed. Furthermore, since there is a gap between elongated plate-shaped members at each boundary, it is difficult to say that the entire glass surface is pressed by the uniform pressure and the accuracy of the lamination leaves room for improvement.

In addition, in the device in Patent Literature 3, since the pressure when each glass is superimposed is mostly defined by the distance between the lower side running unit of the conveyor belt and the transporting surface, it is thought that it is difficult to adjust the pressing strength compared to a roller. In addition, the thickness of adhesive layer becomes uneven and air bubbles are easily mixed due to causing the difference of the pressure transmissions between a conveyor contact portion and a non-contact portion.

The present invention has been made in view of such circumstances described above and an object thereof is to provide a jig having a structure that differs from jigs of the conventional art and enables flat plates to be bonded while suppressing an air bubble formation. Further, in the present invention, another object thereof is to provide a method of manufacturing a flat-plate laminated body.

A first aspect of the present invention is a flat-plate bonding jig including:
a first surface;
a second surface that is on an opposite side of the first surface, has a plurality of suction holes for sucking a flat-plate, and is curved outward;
a main body connecting the first surface and the second surface; and
a communication means disposed in the main body for communicating the suction holes with a suction means.

A second aspect of the present invention is a flat-plate bonding jig including:
a first surface for receiving pressure;
a second surface that is on an opposite side of the first surface, has a plurality of suction holes for vacuum adsorbing a flat-plate, and is curved outward in a substantially arc shape;
a main body connecting the first surface and the second surface; and
a communication means disposed in the main body for communicating the suction holes with a suction means.

In an embodiment of the flat-plate bonding jig according to the present invention, the first surface is flat or is curved inward in a substantially arc shape with the same level of the curved state of the second surface.

In another embodiment of the flat-plate bonding jig according to the present invention, the second surface is made up of an elastic material.

In still another embodiment of the flat-plate bonding jig according to the present invention, a plurality of suction holes are divided into a plurality of groups arranged in a rolling direction of the jig and are to be communicated with the suction means corresponding to each group.

A third aspect of the present invention is a method of manufacturing a flat-plate laminated body including:
a) a step of preparing a first flat-plate;
b) a step of bringing the second surface of the flat-plate bonding jig according to the present invention into contact with one edge of the first flat-plate, then rolling the jig toward the other edge opposite to the one edge for sucking the entire surface of the first flat-plate along the curved shape of the second surface of the jig;
c) a step of preparing a second flat-plate;
d) a step of applying an adhesive agent onto either or both of the bonding surfaces of the first flat-plate and the second flat-plate; and
e) a step of bringing the bonding surface of the second flat-plate into contact with one edge of the bonding surface of the first flat-plate sucked in the step b), then rolling the jig toward the other edge opposite to the one edge on the first surface of the jig, thereby bonding each bonding surface of the first flat-plate and the second flat-plate.

A fourth aspect of the present invention is a method of manufacturing a flat-plate laminated body including:
a) a step of preparing a first flat-plate;
b) a step of bringing the second surface of the flat-plate bonding jig according to the present invention into contact with one edge of the first flat-plate, then rolling the jig toward the other edge opposite to the one edge while applying pressure to the first surface of the jig for vacuum adsorbing the entire surface of the first flat-plate along the curved shape of the second surface of the jig;
c) a step of preparing a second flat-plate;
d) a step of applying an adhesive agent onto either or both of the bonding surfaces of the first flat-plate and the second flat-plate; and e) a step of bringing the bonding surface of the second flat-plate into contact with one edge of the bonding surface of the first flat-plate vacuum adsorbed in the step b), then rolling the jig toward the other edge opposite to the one edge while applying pressure to the first surface of the jig, thereby bonding each bonding surface of the first flat-plate and the second flat-plate.

In one embodiment of the method of manufacturing the flat-plate laminated body according to the present invention, applying pressure to the first surface in the step b) and the step e) is conducted by rolling a pressure roller on the first surface.

In another embodiment of the method of manufacturing the flat-plate laminated body according to the present invention, the step e) is conducted while retaining the suction power with respect to the first flat-plate by the suction means.

In still another embodiment of the method of manufacturing the flat-plate laminated body according to the present invention, the suction holes are divided into a plurality of groups in a rolling direction of the jig, and are communicated with the suction means corresponding to each group, and as the jig rolls in the step e), sucking with respect to the first flat-plate by the suction means for each group is stopped in sequence from a start position of bonding toward a finish position of bonding of the first flat-plate and the second flat-plate.

In still another embodiment of the method of manufacturing the flat-plate laminated body according to the present invention, the first flat-plate and the second flat-plate are translucent, the adhesive agent is a photo-curable adhesive agent and a step f) of irradiating with light for curing the adhesive agent toward the adhesive agent which is present on the bonding surface of the flat-plate laminated body, is further performed after the step e).

In still another embodiment of the method of manufacturing the flat-plate laminated body according to the present invention, a position adjustment in a bonding surface direction is conducted after the step e) and before the step f).

In still another embodiment of the method of manufacturing the flat-plate laminated body according to the present invention, the flat-plate laminated body manufactured by the method of manufacturing a flat-plate laminated body according to the present invention is considered as a second flat-plate and the steps a) to e) are repeated.

In still another embodiment of the method of manufacturing the flat-plate laminated body according to the present invention, a photo-curable adhesive agent contains (A) a polyfunctional (meth)acrylate, (B) a monofunctional (meth) acrylate and (C) a photopolymerization initiator.

In still another embodiment of the method of manufacturing the flat-plate laminated body according to the present invention, (A) the polyfunctional (meth)acrylate contains a polyfunctional (meth)acrylate oligomer/polymer and/or a bifunctional (meth)acrylate monomer.

In still another embodiment of the method of manufacturing the flat-plate laminated body according to the present invention, (B) the monofunctional (meth)acrylate contains one or more from a group consisting of phenol ethylene oxide 2 mol-modified (methacrylate, 2-(1,2-cyclohexacarboximide)ethyl (meth)acrylate and 2-hydroxy-3-phenoxypropyl (meth)acrylate.

In still another embodiment of the method of manufacturing the flat-plate laminated body according to the present invention, (B) the monofunctional (meth)acrylate contains phenol ethylene oxide 2 mol-modified (meth)acrylate and 2-(1,2-cyclohexacarboximide)ethyl (meth)acrylate.

In still another embodiment of the method of manufacturing the flat-plate laminated body according to the present invention, (B) a monofunctional (meth)acrylate contains phenol ethylene oxide 2 mol-modified (meth)acrylate and 2-hydroxy-3-phenoxypropyl (meth)acrylate.

Still another aspect of the present invention is a method of manufacturing a plate-shaped product including:

g) a step of forming a desired number of divided flat-plate laminated bodies by dividing the flat-plate laminated body obtained using the method of manufacturing the flat-plate laminated body according to the present invention, in a thickness direction; and h) a step of shape processing into a desired shape with respect to each divided flat-plate laminated body; and i) a step of heating the flat-plate laminated body after the step of shape processing for separating each bonded flat-plate, thereby forming a plurality of plate-shaped products.

In an embodiment of the method of manufacturing the plate-shaped product according to the present invention, the step i) includes immersing the flat-plate laminated body into heated water after the step of shape processing to delaminate the adhesive agent in a film state.

Still another aspect of the present invention is a plate-shaped product which is obtained using the method of manufacturing the plate-shaped product according to the present invention.

According to the present invention by using the jig, bonding flat-plates becomes possible while suppressing an air bubble formation. Therefore, it is possible to manufacture a flat-plate laminated body with excellent accuracy of lamination.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
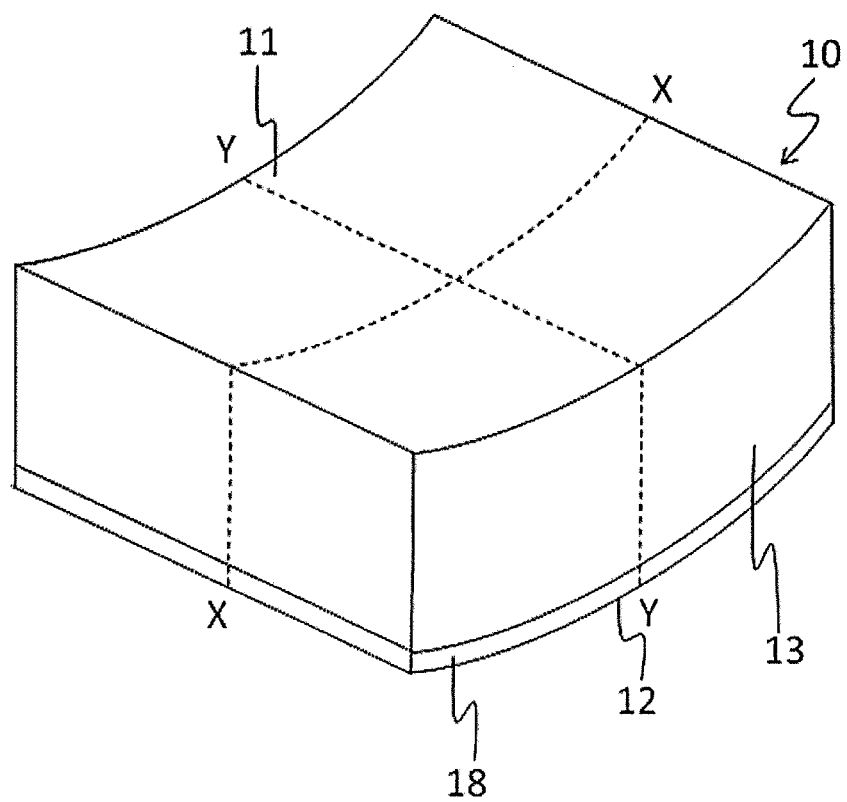
FIG. 1 is a perspective view of a jig according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, embodiments of the present invention will be described with reference to the drawings.

<1. Flat-Plate Bonding Jig>

A jig according to the present invention in an embodiment is provided with a first surface;

a second surface that is on an opposite side of the first surface, has a plurality of suction holes for sucking a flat-plate, and is curved outward;

a main body connecting the first surface and the second surface; and a communication means disposed in the main body for communicating the suction holes with a suction means.

In the first surface, the shape thereof is not particularly limited. The first surface is preferably a surface which receives pressure by human hands, a roller or the like in terms of the productivity. In a case where the first surface is a surface which receives pressure by human hands, a roller or the like, the shape thereof is not particularly limited, however, for example, in a case of applying pressure by a roller, it is preferable to make the shape be a flat surface or make it be curved inward in a substantially arc shape with the same level of the curved state of the second surface in terms of operating a roller and the latter is more preferable. In a case of applying pressure by human hands, a handle or a grip may be also set on the first surface so as to easily manipulate by hands. As a method of applying pressure, a method which applies a liner pressure as a coater and a nip roll (for example, a nip roll by Web Handling), is included.

The second surface that is formed on the opposite side of the first surface, has a plurality of suction holes for sucking a flat-plate, and is curved outward. It is possible to suck a flat-plate along the curved shape of the second surface by the suction holes. In the second surface, the shape and arrangement of the suction holes are not particularly limited, however, an area per suction hole is preferably set to 10 $mm^2$ or less, can be typically set to from 1 to 7 $mm^2$ and more typically 3 to 6 $mm^2$ so that dispersion sucking can be performed using many small holes in order not to locally deform a part of thin plate glass and not to leave a trace of suction due to suction power. Typically, it can be a round shape with a diameter of 3 mm or less, for example, from 1 to 2 mm. In a case of arranging small holes, an even interval arrangement or a staggered arrangement are preferable so that the suction power is uniform, however, the small holes may be a porous ceramic body having a minute through holes. As a shape curved outward, the shape of a substantially circumferential shape, a substantially arc shape and a substantially curved shape are included. Among these, a substantially arc shape is preferable in terms of the productivity. As the second surface in a substantially circumferential shape, a coater, a nip roll, or the like is included. As suction means, a vacuum adsorbing is included. The vacuum adsorbing includes a decompression adsorbing. Among these, the vacuum adsorbing is preferable in terms of the productivity.

Hereinafter, a case where the first surface is a surface which receives pressure, the shape curved outward is a substantially arc shape, and the suction means is a vacuum adsorbing, will be mainly described, though not limited to this method.

Accordingly, it is possible to prevent the generation of the bias of the suction power with respect to the flat-plate. In addition, since the second surface has such a curved shape, when rolling the jig while applying pressure on the first surface for bonding one flat-plate which has been vacuum-adsorbed to the second surface with the other flat-plate, it becomes difficult to generate air bubbles. Regarding the curved state of the second surface body, the effect of suppressing an air bubble formation becomes small when the radius of curvature is too large, while the second surface body is broken up or the adsorptive immobilization cannot be performed due to exceeding the limit of elasticity of the flat-plate when the radius of curvature is too small. Thus, the radius of curvature is preferably from 1 to 50 m and is more preferably from 3 to 30 m.

All of a plurality of suction holes described above can be communicated with the same suction means, however, it is preferable that a plurality of suction holes be divided into a plurality of groups arranged in a rolling direction of the jig and be communicated with the suction means corresponding to each group. Accordingly, the suction holes in each group become possible to independently control the suction pressure for each group. As a result, for example, when each flat-plate is gradually bonded according to rolling of the jig, by stopping the suction power from the start position of bonding toward the finish position of bonding of the flat-plates in sequence, it is possible to prevent the surface part of the flat-plates corresponding to the group which has finished bonding from delaminating due to the suction power from the suction holes.

The material of a main body may only have the rigidity to tolerate an applying pressure, a cheap SS structural steel may be fine, however, in a case of preventing rust formation, a stainless steel or a ceramic material is preferable.

The second surface of the jig is preferably made up of an elastic material such as a rubber according to the reasons that it is difficult to generate a scratch on a flat-plate, the adhesion is high, and it is possible to uniformly apply pressure. Therefore, for example, it is possible to bond an elastic sheet on the lower part of the main body. The hardness of the elastic material is approximately 60 to 80° and preferably 70 to 75° from the adhesive property of the flat-plate and the uniform transmissibility of the power of applying pressure, and the thickness is preferably approximately 1 to 3 mm. The elastic sheet can be made up of a rubber sheet as well as a sponge shape rubber body having a porous through suction holes. The main body 13 can be also an elastic material and in this case, it is not necessary to be provided with a separate elastic sheet. In the present invention, the hardness indicates a value measured by durometer type A conforming to JIS K 6253.

The first surface of the jig can be also made up of an elastic material due to the reasons such as non-skid of a roller. In a case where the material of the roller is a metal material, this is particularly effective. In a case where the material of the surface of a roller is an elastic material such as a rubber, the first surface of the jig may be also made up of a metal material. Therefore, for example, the elastic sheet can be bonded onto the upper surface of the main body.

The communication means is not particularly limited as long as the communication means has the structure in which the suction power from the suction means such as a suction pump, an ejector and a vacuum pump can be transmitted to a suction hole 14, however, is generally configured by a tube, a chamber and the combination thereof, and is provided with an exit for connecting to the suction means. The number and the position of the exit is not particularly limited, however, the exit is preferably provided for each group described earlier and in addition, it is more convenient for a plumbing routing to make all exits present close to each other (for example, on the same side of a surface).

Figure 2:
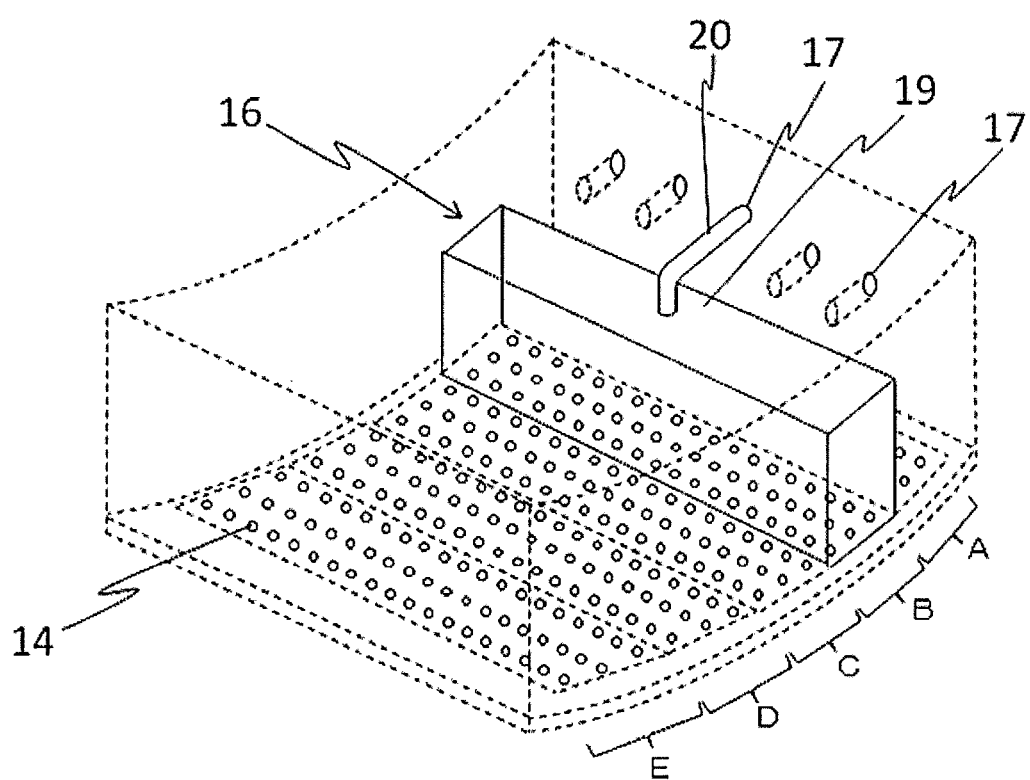
FIG. 2 is a schematic view for describing an example of a structure of a jig according to the present invention.

FIG. 1 is a perspective view of that illustrates an example of a jig according to an embodiment of the present invention. FIG. 2 is a schematic view for describing a structure of a jig according to the embodiment.

A 10 according to the embodiment includes an upper surface 11 which is curved inward in a substantially arc shape corresponding to the curved state of the second surfaces body, a lower surface 12 which is formed on the opposite side of the upper surface 11, has a plurality of suction holes 14 for vacuum adsorbing a flat-plate, and is curved outward in a substantially arc shape, a main body 13 connecting the upper surface 11 and the lower surface 12, and a communication means 16 disposed in the main body 13 for communicating the suction holes 14 with the suction means (not shown). In addition, the side surface on the side of the start position of bonding in the main body 13 has a plurality of exits 17 for the communication means and the suction means is connected thereto.

When viewing the jig 10 according to the embodiment from a cross-section of the direction parallel to the rolling direction of the jig 10 (a cross-section of X-X line in FIG. 1), both the upper surface and the lower surface are the substantially arc shapes which have the substantially same radius of curvature. In addition, when viewing the jig 10 from a cross-section of the direction perpendicular to the rolling direction of the jig 10 (a cross-section of Y-Y line in FIG. 1), the cross sectional shape is a rectangle.

The main body 13 of the jig 10 according to the embodiment is made up of a metal steel material. A rubber sheet 18 in which the hardness of the elastic material is from approximately 70 to 75° is bonded on the lower surfaces of the main body 13, as a result, the lower surface 12 of the jig 10 is made of rubber.

Many suction holes 14 of the jig 10 according to the embodiment are regularly distributed at uniform intervals on the entire lower surface 12 as shown in FIG. 2. In addition, the suction holes 14 are divided into A to E of five groups in the rolling direction of the jig 10 and communicated with the suction means (not shown) corresponding to each group through the communication means 16. Accordingly, the suction holes 14 in each group become possible to independently control the suction pressure for each group.

Figure 3:
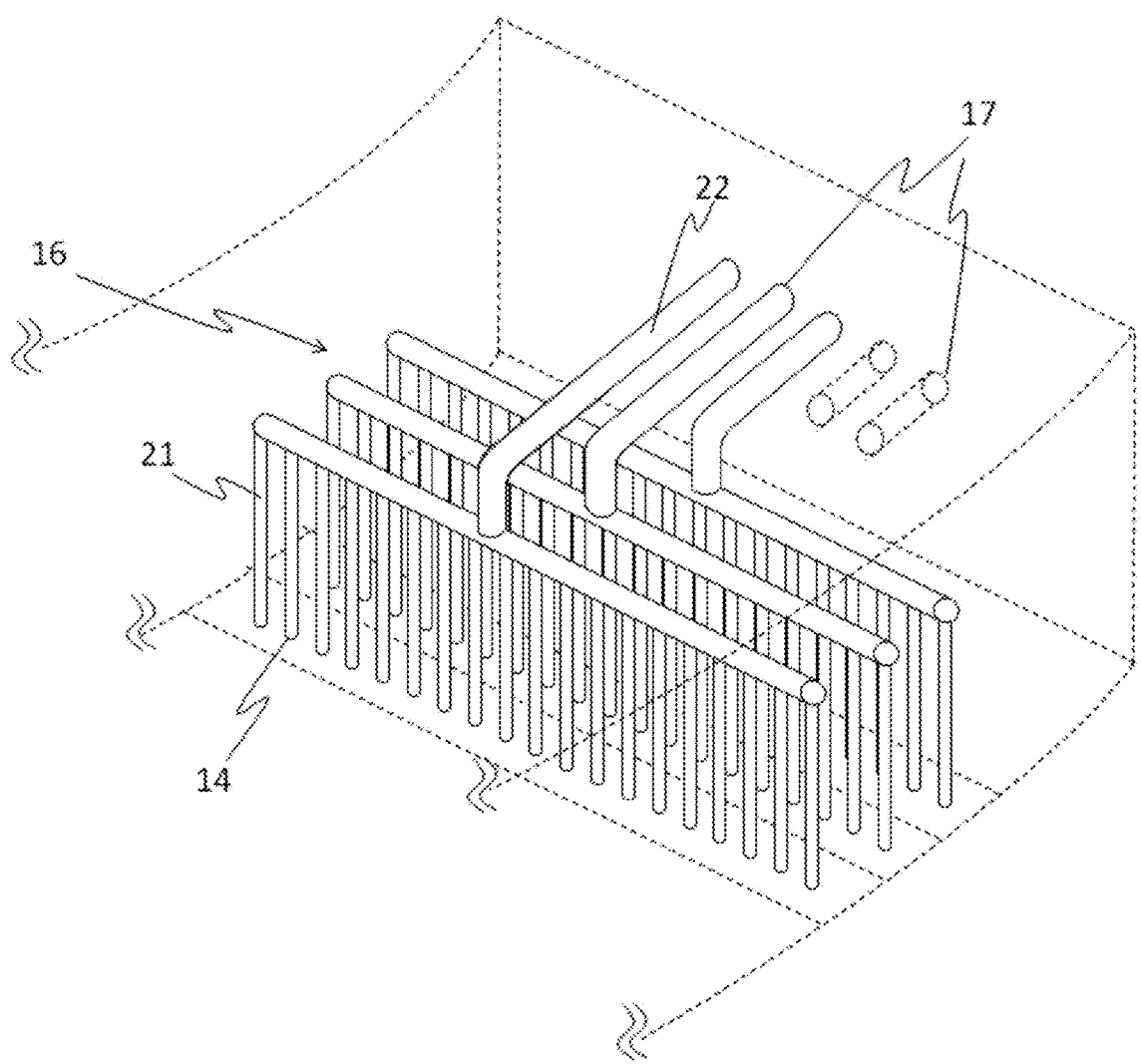
FIG. 3 is a schematic view for illustrating an example of the communication means of a jig according to the present invention.

The communication means 16 of the jig 10 according to the embodiment is configured by a hollow cavity 19 in a substantially cuboid shape directly connected to the suction holes 14 for each group and a suction tube 20 extended beyond from the upper surface of each hollow cavity 19 toward the exit 17 as shown in FIG. 2. In addition, FIG. 3 illustrates another embodiment of the communication means 16, and here, the communication means 16 is configured by a branch tube 21 connected to each suction hole 14, and a collecting tube 22 connected to each branch tube 21 and delivers air which has been sucked from each branch tube 21, to the exits 17 per group all at once.

<2. Method of Manufacturing Flat-Plate Laminated Body>

Next, an embodiment of a method of manufacturing a flat-plate laminated body by using a flat-plate bonding jig according to the present invention will be described.

A method of manufacturing a flat-plate laminated body according to the present invention in an embodiment includes:

a) a step of preparing a first flat-plate;

b) a step of bringing the second surface of the flat-plate bonding jig into contact with one edge of the first flat-plate, then rolling the jig toward the other edge opposite to the one edge for sucking the entire surface of the first flat-plate along the curved shape of the second surface of the jig;

c) a step of preparing a second flat-plate;

d) a step of applying an adhesive agent onto either or both of the bonding surfaces of the first flat-plate and the second flat-plate; and e) a step of bringing the bonding surface of the second flat-plate into contact with one edge of the bonding surface of the first flat-plate sucked in the step b), then rolling the jig toward the other edge opposite to the one edge on the first surface of the jig, thereby bonding each bonding surface of the first flat-plate and the second flat-plate.

A method of manufacturing a flat-plate laminated body according to the present invention in a preferred embodiment includes:

a) a step of preparing a first flat-plate;

b) a step of bringing the second surface of the flat-plate bonding jig according to the present invention into contact with one edge of the first flat-plate, then rolling the jig toward the other edge opposite to the one edge while applying pressure to the first surface of the jig for vacuum adsorbing the entire surface of the first flat-plate along the curved shape of the second surface of the jig;

c) a step of preparing a second flat-plate;

d) a step of applying an adhesive agent onto either or both of the bonding surfaces of the first flat-plate and the second flat-plate; and e) a step of bringing the bonding surface of the second flat-plate into contact with one edge of the bonding surface of the first flat-plate vacuum adsorbed in the step b), then rolling the jig toward the other edge opposite to the one edge while applying pressure to the first surface of the jig, thereby bonding each bonding surface of the first flat-plate and the second flat-plate.

In the step a) and the step c), the first and the second flat-plates targeted for being bonded are prepared. The flat-plate is not particularly limited, however, a translucent rigid substrate such as a plate glass (a material plate glass, a glass substrate with a transparent conductive film, a glass substrate in which an electrode or a circuit are formed, or the like), a sapphire substrate, a quartz substrate, a plastic substrate, a magnesium fluoride substrate as well as a metal plate and a plated metal plate such as a copper plate, an aluminum plate, a copper-aluminum complex, a nickel plated copper plate, a gold plated copper plate are included. The size of the flat-plate is not particularly limited, however, typically is from approximately 10,000 to 1,000,000 $mm^2$ in area and from approximately 0.1 to 2 mm in thickness. Each flat-plate is generally the same size. There is no limitation, however, the surface of each flat-plate can be added a predetermined printing pattern or plated pattern for performing one of the functions of the plate-shaped products. An example of the printing pattern includes a design for a display screen of a mobile phone, and an example of the plated pattern includes a metal wiring pattern such as an Al or an AlNd or a rotary encoder in which a chrome plated pattern is given.

The flat-plate is not limited to a flat-plate which is configured by one plate and a flat-plate in which a plurality of plates are laminated, may be fine. In addition, the flat-plate laminated body which is obtained using the method of manufacturing the flat-plate laminated body according to the present invention, can also be used. By repeating the procedure of bonding new flat-plates to the obtained flat-plate laminated body, it is possible to manufacture a flat-plate laminated body in which three or more flat-plates are laminated. From the point of view of improvement of the productivity of a plate-shaped product, it is desirable to manufacture the flat-plate laminated body in which 10 or more flat-plates, and typically from 10 to 30 flat-plates are laminated.

In the step b), firstly, the second surface of the jig according to the present invention comes into contact with one edge of the first flat-plate. In doing so, it is possible to gradually adsorb the first flat-plate to the second surface of the jig by rolling the jig. In a preferable embodiment, the first flat-plate is a rectangle shape and one linear edge comes into linear contact with the second surface of the jig. This can be achieved by the first flat-plate being disposed so that the one edge makes a right angle with the rolling direction of the jig.

In the step b), thereafter, the entire surface of the first flat-plate is vacuum-adsorbed along the curved shape of the second surface of the jig by rolling the jig toward the other edge opposite to the one edge while applying pressure on the first surface of the jig. It is also possible to apply pressure by human hands, however, in a case of desiring the accuracy of the operation, a roller which can control the pressure is preferably used. As described above, the second surface of the jig according to the present invention is provided with a plurality of suction holes and the first flat-plate is gradually adsorbed by the suction power from the suction holes as the first flat-plate comes into contact with the second surface of the jig along with rolling of the jig. In addition, by the second surface of the jig according to the present invention being curved in a substantially arc shape, the first flat-plate is also curved accordingly. In this way, by maintaining the first flat-plate in a curved state, an advantage of preventing air bubbles from entering the bonding surface, is obtained when bonding with the second flat-plate at a later stage.

The adsorption power can be appropriately set according to the material and the thickness of the flat-plate, and for example, in a plate glass which has 0.7 mm of the thickness, 500 mm of the width and 500 mm of the length, when the radius of curvature of the second surface is set to 2,000 mm, the adsorption power can be set to be 1,000 g or more.

In the step d), an adhesive agent is applied onto either or both of the bonding surfaces of the first flat-plate and the second flat-plate. An adhesive agent is not particularly limited, an air-setting adhesive agent which is cured by itself by leaving, a photo-curable adhesive agent, a thermosetting adhesive agent, a sticky adhesive agent, and the like are included, however, in a case where there is a need to eventually separate a laminated body, the photo-curable adhesive agent is preferable. The photo-curable adhesive agent is cured by irradiation with light such as ultraviolet rays, is an adhesive agent which is softened when heating up to high temperature and various kinds of adhesive agents are known. The wavelength of light which is irradiated may be appropriately changed according to the characteristic of an adhesive agent which is used, however, for example, a microwave, an infrared ray, a visible light, an ultraviolet ray, an X-ray, a γ-ray, an electron beam, or the like can be irradiated. Due to convenient use and having a relatively high energy, an irradiation light is generally an ultraviolet ray. As a light source, for example, a black light, a high pressure mercury lamp, a LED light, a metal halide lamp can be used. In this way, in the present invention, light indicates not only visible light, but also an electromagnetic wave (an energy line) which includes a wide range of wavelength.

As the photo-curable adhesive agent used in the present invention, any known photo-curable adhesive agents can be used and there is no particular limitation. The photo-curable adhesive agent may be applied to either bonding surface of the flat-plates, however, from the point of view of improvement of the adhesive property, it is preferable that the photo-curable adhesive agent be applied to the both bonding surfaces of the flat-plates.

From the point of view of the accuracy of the lamination, it is preferable that the adhesive agent be spread onto the entire bonding surface with constant thickness. When the amount of the adhesive agent which is applied is too small, the adhesive agent is not spread onto the entire bonding surface and this causes an air bubble formation on the bonding surface. When air bubbles are generated, the accuracy of the position is impaired. When the amount of the adhesive agent which is applied is too large, the adhesive agent is leaked from the gap between the bonding surfaces. Even though some adhesive agent is leaked, the adhesive agent may be wiped up so this is not a serious problem, however, the adhesive agent becomes a waste when the amount thereof is large.

As the photo-curable adhesive agent preferably used in the present invention, for example, an adhesive composition containing (A) a polyfunctional (meth)acrylate, (B) a monofunctional (meth)acrylate and (C) a photopolymerization initiator as described in WO2008/018252, is included.

As (A) the polyfunctional (meth)acrylate, a polyfunctional (meth)acrylate oligomer/polymer which is (meth)acrylated at two or more terminals or side chains of an oligomer/a polymer and a polyfunctional (meth)acrylate monomer having two or more (meth)acryloyl groups, can be used. For example, as a polyfunctional (meth)acrylate oligomer/polymer, 1,2-polybutadiene-terminated urethane (meth)acrylate (for example, "TE-2000" and "TEA-1000" manufactured by Nippon Soda Co., Ltd.), a hydrogenated product thereof (for example, "TEAM 000" manufactured by Nippon Soda Co., Ltd.), 1,4-polybutadiene-terminated urethane (meth)acrylate (for example, "BAC-45" manufactured by Osaka Organic Chemical Industry Ltd.), polyisoprene-terminated (meth)acrylate, polyester-based urethane (meth)acrylate (for example, "UV-2000B", "UV-3000B" and "UV-7000B" manufactured by The Nippon Synthetic Chemical Industry CO., Ltd. and "KHP-11" and "KHP-17" manufactured by Negami Chemical Industrial Co., Ltd.), polyether-based urethane (meth)acrylate (for example, "UV-3700B" and "UV-6100B" manufactured by The Nippon Synthetic Chemical Industry CO., Ltd.), bisphenol A type epoxy (meth)acrylate, or the like is included.

Among these, in terms of large effect, polyester-based urethane (meth)acrylate and/or polyether-based urethane (meth)acrylate are preferable and polyester-based urethane (meth)acrylate is more preferable.

The weight average molecular weight of the polyfunctional (meth)acrylate oligomer/polymer is preferably from 10,000 to 60,000 and more preferably from 13,000 to 40,000. The weight average molecular weight is obtained by using a GPC system (SC-8010 manufactured by Tosoh Corporation) or the like and creating the calibration curve with a commercial standard polystyrene.

As bifunctional (meth)acrylate monomer, 1,3-butylene glycol di(meth)acrylate, 1,4-butanediol di(meth)acrylate, 1,6-hexanediol di(meth)acrylate, 1,9-nonanediol di(meth) acrylate, neopentyl glycol di(meth)acrylate, dicyclopentanyl di(meth)acrylate, 2-ethyl-2-butyl-propanediol di(meth)acrylate, neopentyl glycol-modified trimethylolpropane di(meth) acrylate, stearic acid-modified pentaerythritol di(meth)acrylate, polypropylene glycol di(meth)acrylate, 2,2-bis(4-(meth)acryloxydiethoxyphenyl)propane, 2,2-bis(4-(meth) acryloxypropoxyphenyl)propane or 2,2-bis(4-(meth) acryloxytetraethoxyphenyl)propane, or the like is included. Among these, in terms of large effect, 1,6-hexanediol di(meth)acrylate and/or dicyclopentanyl di (meth)acrylate are preferable and dicyclopentanyl di(meth)acrylate is more preferable.

As trifunctional (meth)acrylate monomer, trimethylolpropane tri(meth)acrylate or tris[(meth)acryloxyethyl]isocyanurate, or the like is included.

As tetrafunctional or more (meth)acrylate monomer dimethylolpropane tetra(meth)acrylate, pentaerythritol tetra(meth)acrylate, pentaerythritolethoxy tetra(meth)acrylate, dipentaerythritol penta(meth)acrylate or dipentaerythritol hexa(meth)acrylate, or the like is included.

Among polyfunctional (meth)acrylates, in terms of large effect, it is preferable that a polyfunctional (meth)acrylate oligomer/polymer and/or a bifunctional (meth)acrylate monomer are used and it is more preferable that a polyfunctional (meth)acrylate oligomer/polymer and a bifunctional (meth)acrylate monomer be combined to use.

The content ratio of a case where a polyfunctional (meth)acrylate oligomer/polymer and a bifunctional (meth)acrylate monomer are combined to use is preferably polyfunctional (meth)acrylate oligomer/polymer:bifunctional (meth)acrylate monomer=from 10 to 90:from 90 to 10, more preferably from 25 to 75:from 75 to 25 and most preferably 40 to 65:60 to 35 as the mass ratio in 100 parts by mass of the total of a polyfunctional (meth)acrylate oligomer/polymer and a bifunctional (meth)acrylate monomer.

As (B) the monofunctional (meth)acrylate monomer, methyl (meth)acrylate, ethyl (meth)acrylate, propyl (meth) acrylate, butyl (meth)acrylate, 2-ethylhexyl (meth)acrylate, isooctyl (meth)acrylate, isodecyl (meth)acrylate, lauryl (meth)acrylate, stearyl (meth)acrylate, phenyl (meth)acrylate, cyclohexyl (meth)acrylate, dicyclopentanyl (meth) acrylate, dicyclopentenyl (meth)acrylate, dicyclopentenyloxyethyl (meth)acrylate, isobornyl (meth)acrylate, methoxylated cyclodecatriene (meth)acrylate, 2-hydroxyethyl (meth)acrylate, 2-hydroxypropyl (meth)acrylate, 3-hydroxypropyl (meth)acrylate, 4-hydroxybutyl (meth)acrylate, tetrahydrofurfuryl (meth)acrylate, 2-hydroxy-3-phenoxypropyl (meth)acrylate, glycidyl (meth)acrylate, caprolactone-modified tetrahydrofurfuryl (meth)acrylate, 3-chloro-2-hydroxypropyl (meth)acrylate, N,N-dimethylaminoethyl (meth)acrylate, N,N-diethylaminoethyl (meth)acrylate, t-butylaminoethyl (meth)acrylate, ethoxycarbonylmethyl (meth)acrylate, phenol ethylene oxide-modified (meth)acrylate, phenol (ethylene oxide 2 mol-modified) (meth)acrylate, phenol (ethylene oxide 4 mol-modified) (meth)acrylate, paracumylphenol ethylene oxide-modified (meth)acrylate, nonylphenol ethylene oxide-modified (meth)acrylate, nonylphenol (ethylene oxide 4 mol-modified) (meth)acrylate, nonylphenol (ethylene oxide 8 mol-modified) (meth)acrylate, nonylphenol (propylene oxide 2.5 mol-modified) (meth)acrylate, 2-ethylhexylcarbitol (meth)acrylate, ethylene oxide-modified phthalate (meth)acrylate, ethylene oxide-modified succinate (meth)acrylate, trifluoroethyl (meth)acrylate, acrylic acid, methacrylic acid, ω-carboxy-polycaprolactone mono(meth)acrylate, phthalate monohydroxyethyl (meth)acrylate, a (meth)acrylic acid dimer, β-(meth)acryloyloxyethyl hydrogen succinate, n-(meth) acryloyloxyalkyl hexahydrophthalimide, 2-(1,2-cyclohexane carboximide)ethyl (meth)acrylate, ethoxy diethylene glycol (meth)acrylate, benzyl (meth)acrylate, or the like is included. Furthermore, maleic acid and fumaric acid can be used.

Among monofunctional (meth)acrylates, in terms of large effect, one or more from a group consisting of phenol (ethylene oxide 2 mol-modified) (meth)acrylate, 2-(1,2-cyclohexane carboximide)ethyl (meth)acrylate and 2-hydroxy-3-phenoxypropyl (meth)acrylate are preferable. Phenol (ethylene oxide 2 mol-modified) (meth)acrylate, and 2-(1,2-cyclohexane carboximide)ethyl (meth)acrylate and/or 2-hydroxy-3-phenoxypropyl (meth)acrylate are more preferably combined to use.

The content ratio of a case where phenol (ethylene oxide 2 mol-modified) (meth)acrylate, and 2-(1,2-cyclohexane carboximide)ethyl (meth)acrylate and/or 2-hydroxy-3-phenoxypropyl (meth)acrylate are combined to use is preferably phenol (ethylene oxide 2 mol-modified) (meth)acrylate: 2-(1,2-cyclohexane carboximide)ethyl (meth)acrylate and/ or 2-hydroxy-3-phenoxypropyl (meth)acrylate=from 5 to 80:from 95 to 20, more preferably from 15 to 60:from 85 to 40 and most preferably from 20 to 40:from 80 to 60 as the mass ratio in 100 parts by mass of the total of phenol (ethylene oxide 2 mol-modified) (meth)acrylate, 2-(1,2-cyclohexane carboximide)ethyl (meth)acrylate and 2-hydroxy-3-phenoxypropyl (meth)acrylate.

The mixing ratio of (A) the polyfunctional (meth)acrylate and (B) the monofunctional (meth)acrylate is preferably (A):(B)=from 5:95 to 95:5 (part by mass). When (A) the polyfunctional (meth)acrylate is 5 parts by mass or more, a decrease in the initial adhesive property may not occur and when (A) the polyfunctional (meth)acrylate is 95 parts by mass or less, it is possible to ensure the delamination property. The cured adhesive agent is delaminated in a film form by immersing it into heated water. The content of (B) the monofunctional (meth)acrylate is from 40 to 80 parts by mass in 100 parts by mass of the total of (A) and (B).

(C) the photopolymerization initiator is mixed for accelerating a photo-curing of a resin composition by being sensitized with a visible light ray or an activated light ray of an ultraviolet ray and various kinds of known photopolymerization initiators can be used. Specifically, benzophenone or a derivative thereof; benzyl or a derivative thereof; anthraquinone or a derivative thereof; benzoin; a benzoin derivative such as benzoin methyl ether, benzoin ethyl ether, benzoin propyl ether, benzoin isobutyl ether or benzyl dimethyl ketal; an acetophenone derivative such as diethoxy acetophenone, 4-t-butyl-trichloro acetophenone; 2-dimethylaminoethyl benzoate; p-dimethylaminoethyl benzoate; diphenyl disulphide; thioxanthone or a derivative thereof; camphorquinone; a camphorquinone derivative such as 7,7-dimethyl-2,3-dioxobicyclo[2.2.1]heptane-1-carboxylic acid, 7,7-dimethyl-2,3-dioxobicyclo[2.2.1]heptane-1-carboxy-2-bromo-ethyl ester, 7,7-dimethyl-2,3-dioxobicyclo[2.2.1] heptane-1-carboxy-2-methyl ester, 7,7-dimethyl-2,3-dioxobicyclo[2.2.1]heptane-1-carboxylic acid chloride; an α-aminoalkyl phenone derivative such as 2-methyl-1-[4-(methylthio)phenyl]-2-morpholinopropan-1-one, 2-benzyl-2-dimethylamino-1-(4-morpholinophenyl)-butanone-1; an acylphosphine oxide derivative such as benzoyl diphenyl phosphine oxide, 2,4,6-trimethyl benzoyl diphenyl phosphine oxide, benzoyl diethoxy phosphine oxide, 2,4,6-trimethyl benzoyl dimethoxyphenyl phosphine oxide, 2,4,6-trimethyl benzoyl diethoxyphenyl phosphine oxide; oxyphenyl-acetic acid 2-[2-oxo-2-phenyl-acetoxy-ethoxy]-ethyl ester and/or oxy-phenyl-acetic acid 2-[2-hydroxy-ethoxy]-ethyl ester, or the like is included. The photopolymerization initiator can be used alone or in combination of two kinds or more of them. Among these, in terms of large effect, one or two or more from a group consisting of benzyl dimethyl ketal, oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester are preferable.

The content of (C) the photopolymerization initiator is preferably from 0.1 to 20 parts by mass and more preferably from 0.5 to 10 parts by mass with respect to 100 parts by mass of the total of (A) and (B). When the content is 0.1 parts by mass or more, it is possible to certainly obtain the effect of cure acceleration and when the content is 20 parts by mass or less, it is possible to obtain the sufficient cure rate. Adding one part by mass or more of (C) component is more preferable in that curing can be performed irrespective of the amount of irradiation of light, and the degree of crosslinking of a cured body of the composition is increased, suppressing misalignment and the like during cutting processing and improving a delaminating property.

The photo-curable adhesive agent preferably includes a granular material (D) which is not dissolved in the components (A), (B) and (C) of the adhesive agent. Accordingly, since it is possible to retain the constant thickness of the composition after curing, the accuracy of processing is improved. In addition, since the coefficients of linear expansion of the cured body of the adhesive composition and the granular material (D) are different, the delaminating property is improved when delaminating after the flat substrates are bonded using the adhesive composition.

As the material of the granular material (D), any of an organic particle or an inorganic particle which is generally used, may be used. Specifically, as an organic particle, a polyethylene particle, a polypropylene particle, a cross-linked polymethacrylate methyl particle, a cross-linked polystyrene particle, or the like is included. As an inorganic particle, a ceramic particle such as glass, silica, alumina, titanium is included.

The granular material (D) is preferably a spherical shape from the point of view of the improvement of the accuracy of processing, in other words, the control of the film thickness of the adhesive agent. The average particle diameter of the granular material (D) by a laser method is preferably in the range of from 20 to 200 μm. When the average particle diameter of the granular material is 20 μm or more, the delamination property is excellent and when it is 200 μm or less, misalignment does not easily occur and the accuracy of dimension becomes excellent. The average particle diameter (D50) is preferably from 35 to 150 μm and further preferably from 50 to 120 μm from the point of view of the delamination property and the accuracy of dimension. The particle diameter distribution is measured by a laser diffraction particle diameter analyzer.

The use amount of the granular material (D) is preferably from 0.01 to 20 parts by mass, more preferably from 0.05 to 10 parts by mass, most preferably from 0.1 to 6 parts by mass and further preferably from 0.2 to 2 parts by mass with respect to 100 parts by mass of the total of (A) and (B) from the point of view of the adhesive property, the accuracy of processing and the delamination property.

A polymerization inhibitor (E) can be added to photo-curable adhesive agent in order to improve the storage stability. As a polymerization inhibitor, methyl hydroquinone, hydroquinone, 2,2-methylene-bis(4-methyl-6-tertiary-butylphenol), catechol, hydroquinone monomethyl ether, mono-tertiary-butyl hydroquinone, 2,5-di-tertiary-butyl hydroquinone, p-benzoquinone, 2,5-diphenyl-p-benzoquinone, 2,5-di-tertiary butyl-p-benzoquinone, picric acid, citric acid, phenothiazine, tertiary-butylcatechol, 2-butyl-4-hydroxyanisole, 2,6-di-tertiary-butyl-p-cresol, or the like is included.

The use amount of the polymerization inhibitor (E) is preferably from 0.001 to 3 parts by mass and more preferably from 0.01 to 2 parts by mass with respect to 100 parts by mass of the total of (A) and (B). When the use amount of the polymerization inhibitor (E) is 0.001 parts by mass or more, it is possible to ensure the storage stability and when it is 3 parts by mass or less, the excellent adhesive property is obtained and non-curing does not also occur.

In the step e), firstly, the bonding surface of the second flat-plate comes into contact with respect to one edge of the bonding surface of the first flat-plate which is vacuum-adsorbed in the step b). Accordingly, the first flat-plate is gradually boned to the bonding surface of the second flat-plate by rolling the jig. In a preferred embodiment, the first flat-plate and the second flat-plate are rectangle shapes having the same size and each corresponding edge of the first flat-plate and the second flat-plate firstly comes into linear contact. This can be achieved by both edges being disposed in the direction which makes a right angle with the rolling direction of the jig.

In the step e), after this, the first flat-plate and the second flat-plate are gradually bonded by rolling the jig toward the other edge opposite to the one edge while applying pressure on the first surface of the jig. Since the first flat-plate is curved outward with respect to the second flat-plate, both flat-plates are bonded while air bubbles are pushed out. It is possible to apply pressure by human hands, however, a roller which can control the pressure, is preferably used in order to make the uniform thickness of an adhesive material layer and minimize the amount of protrusion of the adhesive agent from the side of the flat-plate.

In one embodiment of the method of manufacturing the flat-plate laminated body according to the present invention, bonding of the first flat-plate and the second flat-plate may be conducted while retaining the suction power with respect to the first flat-plate by the suction means. Since the adhesive agent has a certain degree of the adhesive power (cohesion) even though the adhesive agent is not cured, it is possible to prevent the portions of the first flat-plate and the second flat-plate from delaminating after they have come into contact, without stopping or decreasing the suction power by using the adhesive agent having the adhesive power which is stronger than the suction power from the suction holes with respect to the first flat-plate.

In another embodiment of the method of manufacturing the flat-plate laminated body according to the present invention, as described above, the suction holes are divided into a plurality of groups in the rolling direction of the jig, and are communicated with the suction means corresponding to each group, and in the step e), it is possible to stop in sequence the suction with respect to the first flat-plate by the suction means for each group from the start position of bonding toward the finish position of bonding of the first flat-plate and the second flat-plate, according to rolling of the jig. As a result, for example, when each flat-plate is gradually bonded according to rolling of the jig, by stopping in sequence the suction power from the start position of bonding toward the finish position of bonding of the flat-plates, it is possible to prevent the surface part of the flat-plate corresponding to the group for which bonding has been finished from delaminating due to the suction power from the suction holes.

In a case of using a thermosetting adhesive agent or a photo-curable adhesive agent, which is not cured by itself, as an adhesive agent, a heating step or a photo irradiation step can be conducted for curing the adhesive agent after the step e). Therefore, in still another embodiment of the method of manufacturing the flat-plate laminated body according to the present invention, the first flat-plate and the second flat-plate are translucent, the adhesive agent is a photo-curable adhesive agent, and a step f) of irradiating with light for curing the adhesive agent toward the adhesive agent which are present on the bonding surface of the flat-plate laminated body is further performed after the step e). In addition, after both flat-plates are bonded, the position adjustment in the bonding surface direction can be also conducted before the adhesive agent is cured.

The position adjustment can be manually conducted by measuring with the eye, however, for example, use of a guide rail, a bearing bar or a frame may be considered for moving the flat-plate to the constant position by putting the moving direction of the flat-plate under control. In a case where the position determination with higher accuracy is required, the position determination is preferably conducted using an alignment device which can adjust the position in X axis, Y axis and θ axis direction. For the position determination with high accuracy, a mark for alignment is affixed on the surface of each flat-plate and the position adjustment is preferably conducted while imaging the mark using an image pickup device. As an image pickup device, for example, a digital camera using CCD or CMOS as an image sensor as well as an analog camera can be used, however, a digital camera is preferable from the point of view of high resolution.

Each step in the method of manufacturing the flat-plate laminated body according an embodiment of the present invention will be described with reference to FIG. 4 to FIG. 12.

Figure 4:
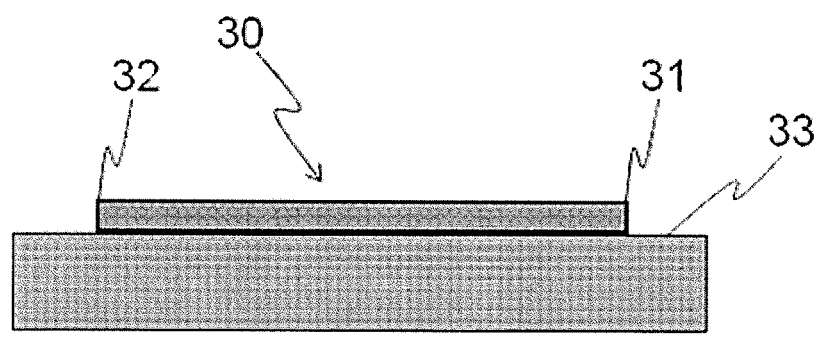
FIG. 4 is a view that illustrates the state in which a first plate glass is set on the cradle.
Figure 5:
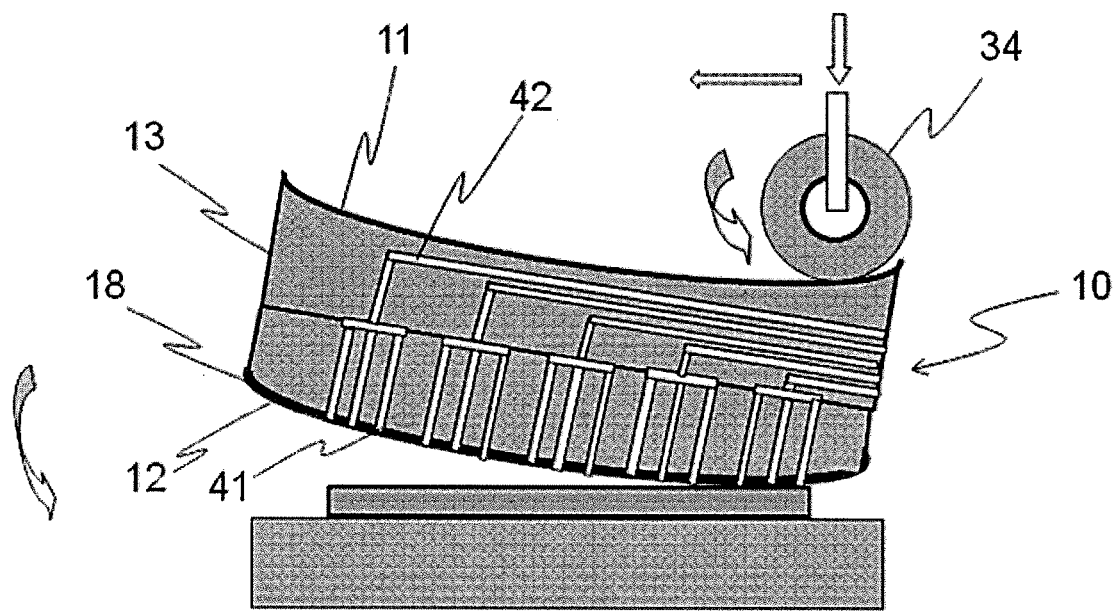
FIG. 5 is a view that illustrates the state when a first plate glass starts to be vacuum-adsorbed on a jig.
Figure 6:
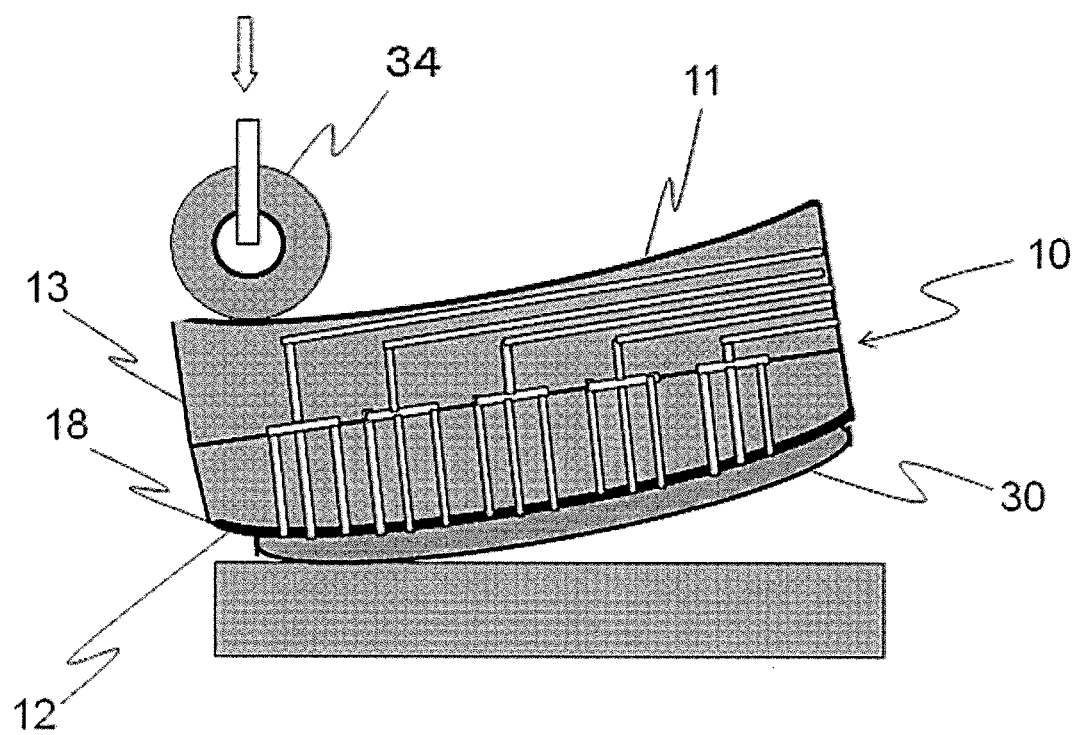
FIG. 6 is a view that illustrates the state when a first plate glass is about to complete being vacuum-adsorbed on a jig.

Firstly, a first plate glass 30 with a rectangle shape is set on a proper cradle 33 so that one edge 31 thereof makes a right angle with the rolling direction of the jig 10 (FIG. 4). Next, the jig 10 is gradually rolled while applying pressure on the upper surface 11 of the jig 10 toward the other edge 32 opposite to the one edge 31 using a roller 34 after the lower surface 12 of the jig 10 in which the rubber sheet 18 is bonded on the lower surface of the main body 13 has been brought into linear contact with the one edge 31 of the first plate glass 30 (FIG. 5), and the entire surface of the first plate glass 30 is vacuum-adsorbed along the curved shape of the lower surface 12 of the jig 10 (FIG. 6).

Figure 7:
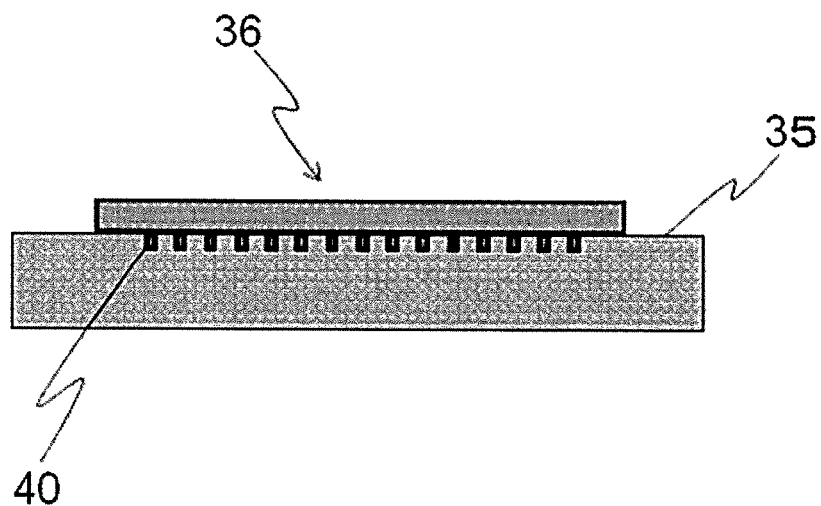
FIG. 7 is a view that illustrates the state in which a second plate glass is set on the cradle.
Figure 8:
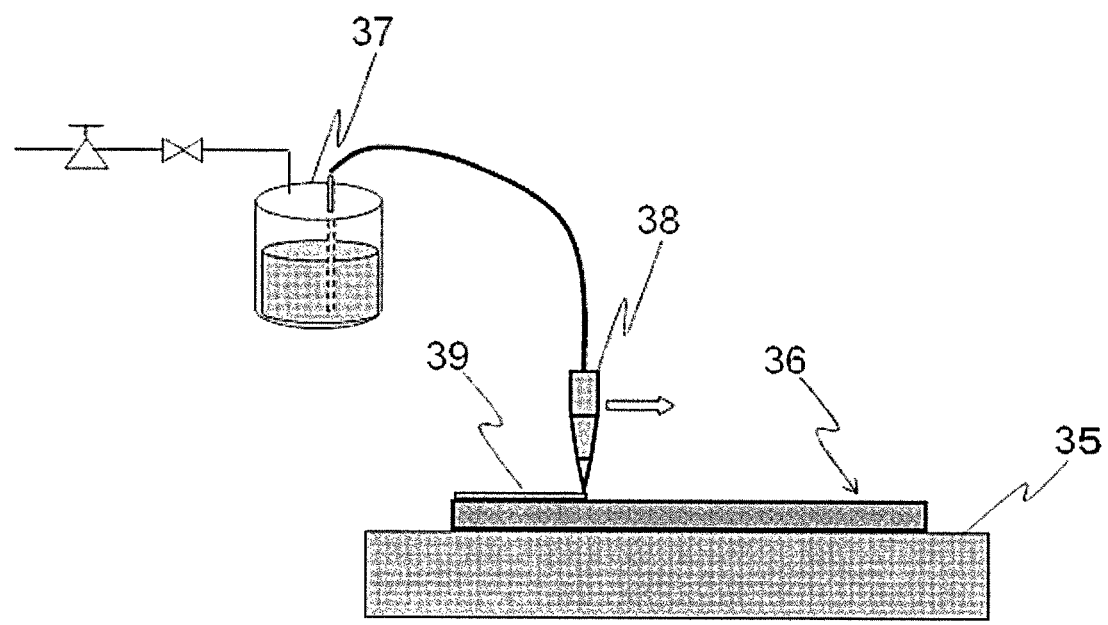
FIG. 8 is a view that illustrates the way that an adhesive agent is being applied onto a second plate glass.
Figure 9:
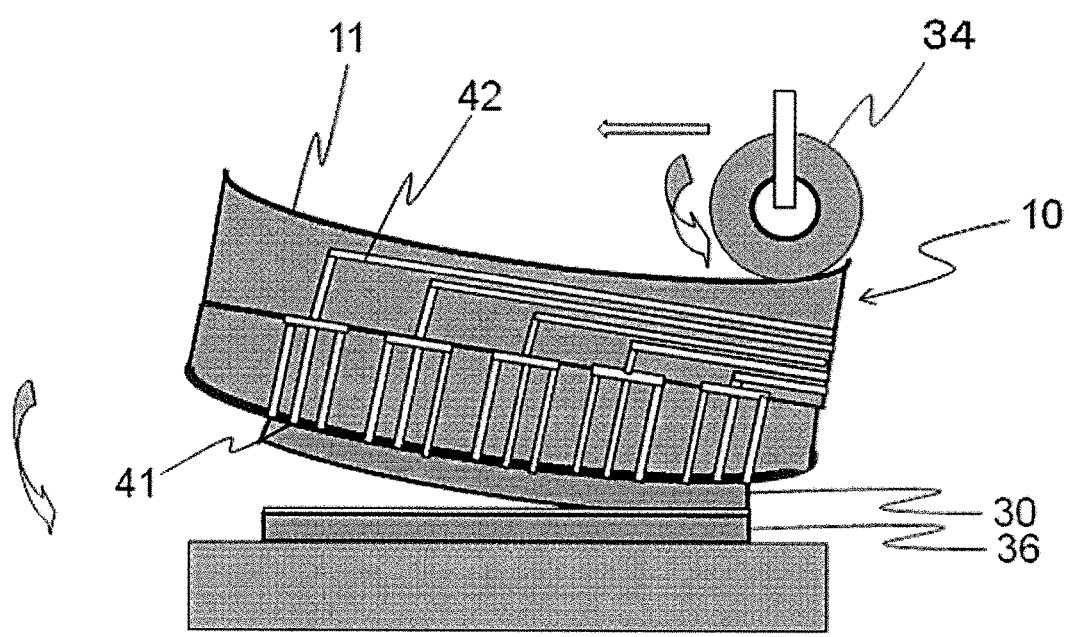
FIG. 9 is a view that illustrates the state when a first plate glass and a second plate glass start to be bonded.
Figure 10:
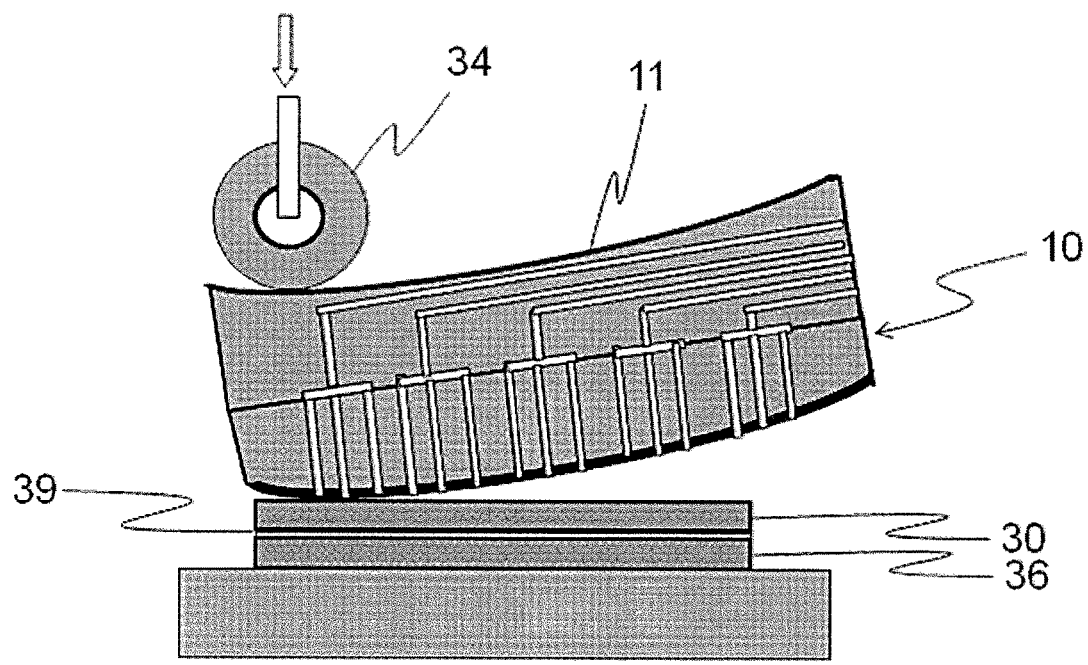
FIG. 10 is a view that illustrates the state when a first plate glass and a second plate glass are about to complete being bonded.

On the other hand, a second plate glass 36 having the same shape as the first plate glass is set on the proper cradle 35 (FIG. 7). The second plate glass 36 may be vacuum-adsorbed using a suction hole 40 which is set on the cradle 35. A photo-curable adhesive agent 39 is applied onto the surface of the second plate glass 36 using a dispenser 38 connected to an adhesive agent supply tank 37 (FIG. 8). The bonding surface of the first plate glass 30 which has been vacuum-adsorbed in advance, is set opposite to the bonding surface of the second plate glass 36 in which the application of the adhesive agent has been completed, and each corresponding edge of the first plate glass and the second plate glass comes into linear contact with each other. After this, the jig 10 is gradually rolled while applying pressure on the upper surface 11 of the jig 10 toward the opposite edge using the roller 34 (FIG. 9), and the bonding between the bonding surfaces of the first plate glass 30 and the second plate glass 36 is completed (FIG. 10).

Suction holes 41 of the jig 10 are divided into a plurality of groups in the rolling direction of the jig 10 and are communicated with the corresponding suction means (not shown) for each group through a suction tube 42. While the first plate glass 30 and the second plate glass 36 are being bonded, as the jig 10 rolls, the suction with respect to the first plate glass 30 by the suction means for each group is stopped in sequence from the start position of bonding toward the finish position of bonding of the first plate glass 30 and the second plate glass 36.

Figure 11:
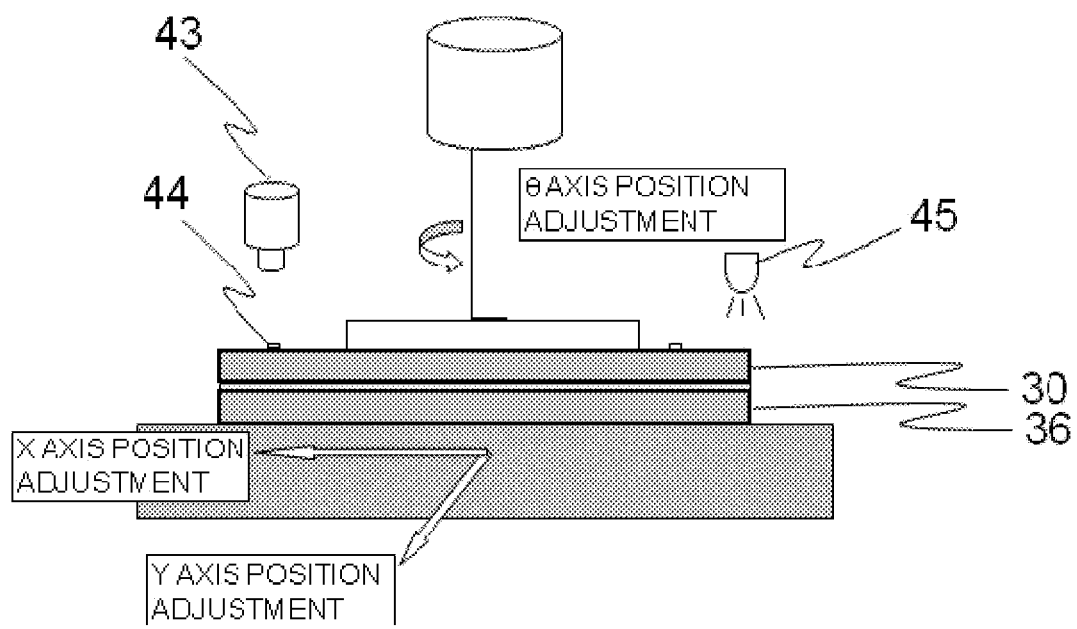
FIG. 11 is a view that illustrates the way that the position adjustment of a first plate glass and a second plate glass is being conducted.
Figure 12:
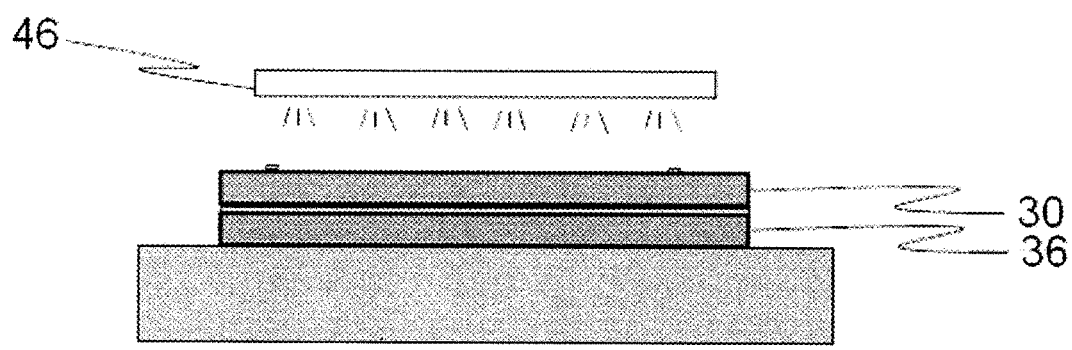
FIG. 12 is a view that illustrates the way that an entire adhesive agent is being cured by irradiation with UV.

After completing the bonding of the first plate glass 30 and the second plate glass 36, the position is adjusted in X axis, Y axis and θ axis direction while imaging alignment marks 44 affixed on both plate glasses using a CCD camera 43 (FIG. 11). At this time, only adhesive agent which is present in the vicinity of periphery may be irradiated with ultraviolet rays for curing by a UV lamp 45 so that misalignment of both plate glasses will not occur after adjusting the position. After this, ultraviolet rays for thoroughly curing the adhesive agent are irradiated toward the adhesive agent which is present on the bonding surface of the flat-plate laminated body using the UV lamp 46 and the adhesion of the first plate glass 30 and the second plate glass 36 is completed (FIG. 12).

<3. Manufacturing of Flat-Plate Product>

It is possible to manufacture a plate-shaped product from the flat-plate laminated body obtained using the method of manufacturing the flat-plate laminated body described above.

In an embodiment, a method of manufacturing a plate-shaped product according to the present invention includes:

g) a step of forming a desired number of divided flat-plate laminated bodies by dividing the flat-plate laminated body obtained using the method of manufacturing the flat-plate laminated body described above, in a thickness direction; and h) a step of shape processing into a desired shape with respect to each divided flat-plate laminated body; and i) a step of heating the flat-plate laminated body after the step of shape processing for separating each bonded flat-plate, thereby forming a plurality of plate-shaped products.

In the step g), the flat-plate laminated body is divided in the thickness direction to form a desired number of divided flat-plate laminated body. A method of dividing is not particularly limited, however, a method in which a disc cutter (a diamond disc, a cemented carbide disc), a fixed abrasive grain type or a loose abrasive type wire saw, a laser beam, an etching (example: a chemical etching using hydrofluoric acid, sulphuric acid or the like, and an electrolytic etching), a water jet, an endmill or a cylindrical grindstone router cutting is respectively used alone or in combination to divide into the same size of cuboid shape, is included. An etching can be also used for the surface treatment of cutting surface after dividing.

Next, in the step h), the desired shape processing with respect to each divided flat-plate laminated body is conducted. In this step, since it is possible to integrally process into the aimed shape of the plate-shaped product for each divided flat-plate laminated body, there is an advantage that the production rate of the plate-shaped product is dramatically increased. The shape processing may be conducted by any known methods, however, for example, a grinding by a grindstone, a drilling by an ultrasonic vibration drill, an end-face processing by a rotating brush, a drilling by an etching, an end-face processing by an etching, an outline processing by an etching, a water jet, a laser beam, or the like is included. The methods for processing can be used alone or in combination. The etching can be also used for the surface treatment after the shape processing.

In the step i), each bonded flat-plate after the shape processing is heated for separating, thereby forming a plurality of plate-shaped products. A method for heating is not particularly limited, however, since the adhesive agent is softened in a film form to smoothly separate each plate-shaped product, a method in which the flat-plate laminated body after the shape processing is immersed into heated water, is preferable. The preferred temperature of heated water differs depending on employed adhesive agent, however, is normally approximately from 70 to 90° C., preferably from 75 to 85° C. and typically 80° C.

Two kinds of photo-curable adhesive agents (I) and (II) were tested. The conditions and the results thereof will be described hereinafter.

The photo-curable adhesive agent (I) was produced by mixing the following components of (A) to (E).

As (A) the polyfunctional (meth)acrylate, 15 parts by mass of "UV-3000B" manufactured by Nippon Synthetic Chemical Industry Co., Ltd. (urethane acrylate, abbreviated below as "UV-3000B", the weight average molecular weight 18,000) and 15 parts by mass of dicyclopentanyl diacrylate ("KAYARAD R-684" manufactured by Nippon Kayaku Co., Ltd., abbreviated below as "R-684");

As (B) the monofunctional (meth)acrylate, 45 parts by mass of 2-(1,2-cyclohexane dicarboximide)ethylacrylate ("ARONIX M-140" manufactured by Toagosei Co., Ltd., abbreviated below as "M-140") and 25 parts by mass of phenol (ethylene oxide 2 mol-modified) acrylate ("ARONIX M-101A" manufactured by Toagosei Co., Ltd.);

As (C) the photopolymerization initiator, 10 parts by mass of benzyl dimethyl ketal ("IRGACURE 651" manufactured by BASF, abbreviated below as "BDK");

As (D) the granular material, 1 part by mass of spherical cross-linked polystyrene particles having the average diameter of 100 μm ("GS-100S" manufactured by Ganz Chemical Co., Ltd.); and As (E) the polymerization inhibitor, 0.1 parts by mass of 2,2-methylene-bis(4-methyl-6-tertiary-butylphenol) ("SUMILIZER MDP-S" manufactured by Sumitomo Chemical Co., Ltd., abbreviated below as "MDP").

The photo-curable adhesive agent (II) was produced by mixing the following components of (A) to (E).

As (A) the polyfunctional (meth)acrylate, 20 parts by mass of "UV-3000B" manufactured by Nippon Synthetic Chemical Industry Co., Ltd. (urethane acrylate, abbreviated below as "UV-3000B", the weight average molecular weight 18,000) and 25 parts by mass of dicyclopentanyl diacrylate ("KAYARAD R-684" manufactured by Nippon Kayaku Co., Ltd., abbreviated below as "R-684");

As (B) the monofunctional (meth)acrylate, 35 parts by mass of 2-hydroxy-3-phenoxypropyl acrylate ("ARONIX M-5700" manufactured by Toagosei Co., Ltd., abbreviated below as "M-5700") and 20 parts by mass of phenol (ethylene oxide 2 mol-modified) acrylate ("ARONIX M-101A" manufactured by Toagosei Co., Ltd.);

As (C) the photopolymerization initiator, 10 parts by mass of benzyl dimethyl ketal ("IRGACURE 651" manufactured by BASF, abbreviated below as "BDK");

As (D) the granular material, 1 part by mass of spherical cross-linked polystyrene particles having the average diameter of 100 μm ("GS-100S" manufactured by Ganz Chemical Co., Ltd.); and As (E) the polymerization inhibitor, 0.1 part by mass of 2,2-methylene-bis(4-methyl-6-tertiary-butylphenyl) ("SUMILIZER MDP-S" manufactured by Sumitomo Chemical Co., Ltd., abbreviated below as "MDP").

The physical properties of the photo-curable adhesive agent (I) and the photo-curable adhesive agent (II) are shown in Table 1. Evaluation methods are as follows.

|Tensile lap-shear strength|[AXIS1] (adhesive strength): it was measured according to JIS K 6850. Specifically, heat-resistant Pyrex (trademark) glass (25 mm×25 mm×2.0 mm) was used as an adherent. The adhesive part was set at 8 mm diameter, two heat-resistant Pyrex (trademark) glasses were bonded using the produced photo-curable adhesive agent, and a test specimen for tensile lap-shear strength was produced by curing with a curing device manufactured by Fusion systems corp. using an electrodeless discharge lamp under the condition of 2,000 mJ/cm$^2$ of integral light of 365 nm of wavelength. Tensile lap-shear strength of the produced test specimen was determined with 10 mm/min of the tension speed under an environment in which the temperature was 23° C. and the humidity was 50% using a universal testing machine.

Delaminating test: the photo-curable adhesive agent was applied to the heat-resistant Pyrex (trademark) glass and the photo-curable adhesive agent produced in the same condition described above except for bonding to a blue plate glass (150 mm×150 mm×1.7 mm thickness) as a support was cured to produce a separating test body. The obtained test body was immersed into heated water (80° C.) to measure the time until the heat-resistant Pyrex (trademark) glass was delaminated and also observe the delaminated state.

The maximum width of the cracks on the back side specimens of the 10 cut test specimens and the standard deviation of the maximum width of cracks on the back side specimens of the 10 cut test specimens: the plate-shaped heat-resistant Pyrex (trademark) glass of 150 mm length× 150 mm width×2 mm thickness and the blue plate glass (used as a dummy glass) which was used in the separating test were adhered and cured in the same way described above using the adhesive agent (I) and the adhesive agent (II). Only heat-resistant Pyrex (trademark) glass part of this adhesive test specimen was cut into 10 mm square using a dicing device. Dropping off of the heat-resistant Pyrex (trademark) glass did not occur while cutting and excellent workability was shown. When the adhesive test specimens in which only heat-resistant Pyrex (trademark) glass part was cut was immersed into heated water of 80° C., all the adhesive test specimens were separated in 60 min. In addition, the separated 10 cut test specimens were taken out at random and each specimen on the back side of the cut test specimens thereof (the surface which was temporarily fixed using the adhesive agent) was observed using an optical microscope and the maximum width of the part where glass was cracked was measured to obtain the average value and the standard deviation thereof.

TABLE 1

| Photo-curable adhesive agent | Photo-curable adhesive agent (I) | Photo-curable adhesive agent (II) |
| --- | --- | --- |
| Adhesive strength (MPa) | 10.9 | 10.6 |
| Time for delaminating in heated water at 80° C. (min, sec) | 30 sec | 30 sec |
| The maximum width of the cracks on back side specimens of the 10 cut test specimens (μm) | 51.3 | 51.2 |

TABLE 1-continued

| Photo-curable adhesive agent | Photo-curable adhesive agent (I) | Photo-curable adhesive agent (II) |
|---|---|---|
| The standard deviation of maximum width of the cracks on the back side specimens of the 10 cut test specimens (μm) | 5.8 | 5.6 |

Hereinabove, embodiments of the present invention have been described with reference to figures, however, the present invention is not limited to these embodiments and various variations can be made.

REFERENCE SIGNS LIST

10 JIG
11 UPPER SURFACE OF JIG
12 LOWER SURFACE OF JIG
13 MAIN BODY
14 SUCTION HOLE
16 COMMUNICATION MEANS
17 EXIT OF COMMUNICATION MEANS
18 RUBBER SHEET
19 HOLLOW CAVITY
20 SUCTION TUBE
21 BRANCH TUBE
22 COLLECTING TUBE
30 FIRST PLATE GLASS
31 ONE EDGE OF FIRST PLATE GLASS
32 THE OTHER EDGE OF FIRST PLATE GLASS
33 CRADLE
34 ROLLER
35 CRADLE
36 SECOND PLATE GLASS
37 ADHESIVE AGENT SUPPLY TANK
38 DISPENSER
39 PHOTO-CURABLE ADHESIVE AGENT
40 SUCTION HOLE OF CRADLE
41 SUCTION HOLE OF JIG
42 SUCTION TUBE
44 CCD CAMERA
44 ALIGNMENT MARK
45, 46 UV LAMP

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A flat-plate bonding jig comprising:
a first surface;
a second surface that is on an opposite side of the first surface, has a plurality of suction holes for sucking a flat-plate, and is curved outward;
a main body connecting the first surface and the second surface; and
a communication means disposed in the main body for communicating the suction holes with a suction means, and
wherein the jig is configured to roll on the flat plate to manufacture a flat-plate laminated body,
wherein the second surface is made up of an elastic material, and
wherein a plurality of suction holes are divided into a plurality of groups arranged in a rolling direction of the jig and are to be communicated with the suction means corresponding to each group.

2. The jig according to claim 1,
wherein the first surface is flat or is curved inward in a substantially arc shape with the same level of the curved state of the second surface.

3. The jig according to claim 1,
wherein the second surface is made up of an elastic material having a hardness of approximately 60 to 80.

4. The jig according to claim 1, wherein the first surface is made up of an elastic material.

5. A flat-plate bonding jig comprising:
a first surface for receiving pressure;
a second surface that is on an opposite side of the first surface, has a plurality of suction holes for vacuum adsorbing a flat-plate, and is curved outward in a substantially arc shape;
a main body connecting the first surface and the second surface; and
a communication means disposed in the main body for communicating the suction holes with a suction means, and
wherein the jig is configured to roll on the flat plate to manufacture a flat-plate laminated body,
wherein the second surface is made up of an elastic material, and
wherein a plurality of suction holes are divided into a plurality of groups arranged in a rolling direction of the jig and are to be communicated with the suction means corresponding to each group.

6. A method of manufacturing a flat-plate laminated body comprising:
a) a step of preparing a first flat-plate;
b) a step of bringing the second surface of the flat-plate bonding jig according to claim 1 into contact with one edge of the first flat-plate, then rolling the jig toward an other edge opposite to the one edge while applying pressure to the first surface of the jig for vacuum adsorbing an entire surface of the first flat-plate along the curved shape of the second surface of the jig;
c) a step of preparing a second flat-plate;
d) a step of applying an adhesive agent onto either or both bonding surfaces of the first flat-plate and the second flat-plate; and
e) a step of bringing the bonding surface of the second flat-plate into contact with one edge of the bonding surface of the first flat-plate vacuum adsorbed in the step b), then rolling the jig toward the other edge opposite to the one edge while applying pressure to the first surface of the jig, thereby bonding each bonding surface of the first flat-plate and the second flat-plate.

7. A method of manufacturing a flat-plate laminated body comprising:
a) a step of preparing a first flat-plate;
b) a step of bringing the second surface of the flat-plate bonding jig according to claim 1 into contact with one edge of the first flat-plate, then rolling the jig toward an other edge opposite to the one edge for sucking an entire surface of the first flat-plate along the curved shape of the second surface of the jig;
c) a step of preparing a second flat-plate;
d) a step of applying an adhesive agent onto either or both bonding surfaces of the first flat-plate and the second flat-plate; and
e) a step of bringing the bonding surface of the second flat-plate into contact with one edge of the bonding surface of the first flat-plate sucked in the step b), then rolling the jig toward the other edge opposite to the one edge on the first surface of the jig, thereby bonding each bonding surface of the first flat-plate and the second flat-plate.

8. The method of manufacturing a flat-plate laminated body according to claim 7,
wherein applying pressure to the first surface in the step b) and the step e) is conducted by rolling a pressure roller on the first surface.

9. The method of manufacturing a flat-plate laminated body according to claim 7,
wherein the step e) is conducted while retaining suction power with respect to the first flat-plate by the suction means.

10. The method of manufacturing a flat-plate laminated body according to claim 7,
wherein the suction holes are divided into a plurality of groups in the rolling direction of the jig, and are communicated with the suction means corresponding to each group, and as the jig rolls in the step e), sucking with respect to the first flat-plate by the suction means for each group is stopped in sequence from a start position of bonding toward a finish position of bonding of the first flat-plate and the second flat-plate.

11. The method of manufacturing a flat-plate laminated body according to claim 7,
wherein the first flat-plate and the second flat-plate are translucent, the adhesive agent is a photo-curable adhesive agent and a step f) of irradiating with light for curing the adhesive agent toward the adhesive agent which is present on the bonding surface of the flatplate laminated body, is further performed after the step e).

12. The method of manufacturing a flat-plate laminated body according to claim 11,
wherein a position adjustment in a bonding surface direction is conducted after the step e) and before the step f).

13. The method of manufacturing a flat-plate laminated body,
wherein the flat-plate laminated body manufactured by the method of manufacturing a flat-plate laminated body according to claim 7 is considered as a second flat-plate and the steps a) to e) are repeated.

14. The method of manufacturing a flat-plate laminated body according to claim 11,
wherein the photo-curable adhesive agent contains (A) a polyfunctional (meth)acrylate, (B) a monofunctional (meth)acrylate and (C) a photopolymerization initiator.

15. The method of manufacturing a flat-plate laminated body according to claim 14,
wherein (A) the polyfunctional (meth)acrylate contains a polyfunctional (meth)acrylate oligomer/polymer and/or a bifunctional (meth)acrylate monomer.

16. The method of manufacturing a flat-plate laminated body according to claim 14,
wherein (B) the monofunctional (meth)acrylate contains one or more from a group consisting of phenol ethylene oxide 2-mol modified (meth)acrylate, 2-(1,2-cyclohexane dicarboximide)ethyl (meth)acrylate and 2-hydroxy-3-phenoxypropyl (meth)acrylate.

17. The method of manufacturing a flat-plate laminated body according to claim 14,
wherein (B) the monofunctional (meth)acrylate contains phenol ethylene oxide 2 mol-modified (meth)acrylate and 2-(1,2-cyclohexane dicarboximide)ethyl (meth)acrylate.

18. The method of manufacturing a flat-plate laminated body according to claim 14,
wherein (B) the monofunctional (meth)acrylate contains phenol ethylene oxide 2 mol-modified (meth)acrylate and 2-hydroxy-3-phenoxypropyl (meth)acrylate.

19. A method of manufacturing a plate-shaped product comprising:
g) a step of forming a desired number of divided flat-plate laminated bodies by dividing the flat-plate laminated body obtained using the method of manufacturing the flat-plate laminated body according to claim 7, in a thickness direction; and
h) a step of shape processing into a desired shape with respect to each divided flat-plate laminated body; and
i) a step of heating each divided flat-plate laminated body after the step of shape processing for separating each bonded flat-plate, thereby forming a plurality of plate-shaped products.

20. The method of manufacturing a plate-shaped product according to claim 19,
wherein the step i) includes immersing each divided flat-plate laminated body into heated water after the step of shape processing to delaminate the adhesive agent in a film state.

* * * * *